United States Patent [19]

Chase

[11] Patent Number: 5,071,253
[45] Date of Patent: Dec. 10, 1991

[54] OPTICAL LIGHT BEAM POSITION CONTROL SYSTEM

[75] Inventor: Roland H. Chase, Lanham, Md.

[73] Assignee: Omega Tech, Inc., Lanham, Md.

[21] Appl. No.: 202,525

[22] Filed: Jun. 6, 1988

Related U.S. Application Data

[63] Continuation-in-part of Ser. No. 812,945, Dec. 26, 1985, which is a continuation-in-part of Ser. No. 509,661, Jun. 30, 1983, abandoned.

[51] Int. Cl.$^5$ .......................... G02F 1/01; G02F 1/29; G02F 1/39; G02B 5/30
[52] U.S. Cl. ................................... 359/245; 359/276; 359/281; 359/248; 359/250
[58] Field of Search ............... 350/355, 356, 375, 376, 350/381, 382, 383, 385, 386, 387, 388

[56] References Cited

U.S. PATENT DOCUMENTS

| | | | |
|---|---|---|---|
| 3,498,693 | 3/1970 | Fein et al. | 350/166 |
| 3,506,334 | 4/1970 | Korpel | 350/356 |
| 3,626,317 | 12/1971 | Dakss et al. | 350/392 |

OTHER PUBLICATIONS

Condon et al., *Handbook of Physics*, McGraw-Hill, New York, 1967, pp. 6-96-6-97.

*Primary Examiner*—Eugene R. LaRoche
*Assistant Examiner*—Michael Shingleton

[57] ABSTRACT

An optical light beam position control system utilizes Kerr cells and Lummer-Gehrcke plates to produce sets of optical phased linear arrays for beam positioning and beam monitoring. The system controls a light beam in the vertical and horizontal axes by the means of two optical phased linear array generators with associated monitoring and positioning optics.

43 Claims, 15 Drawing Sheets

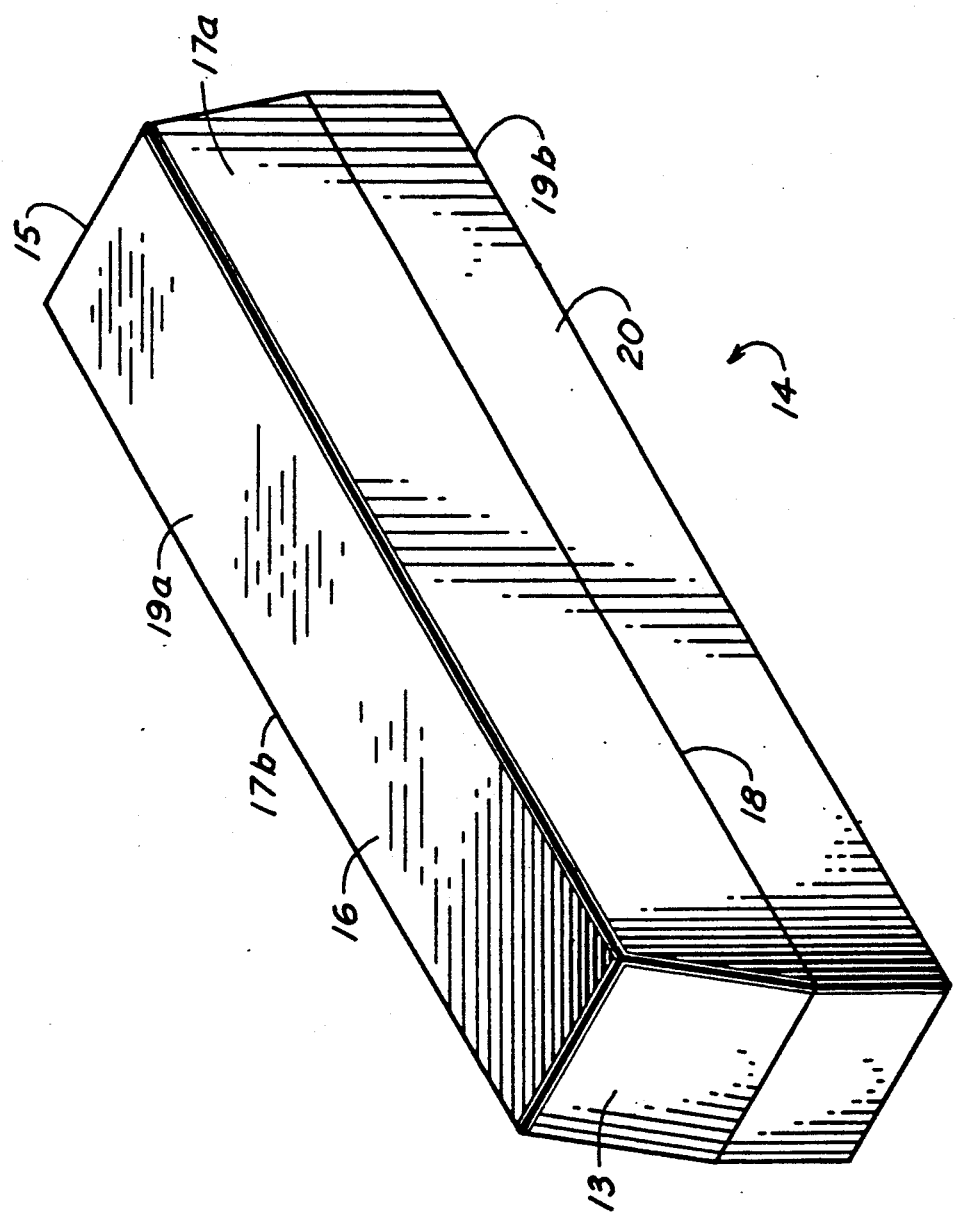
FIG. I

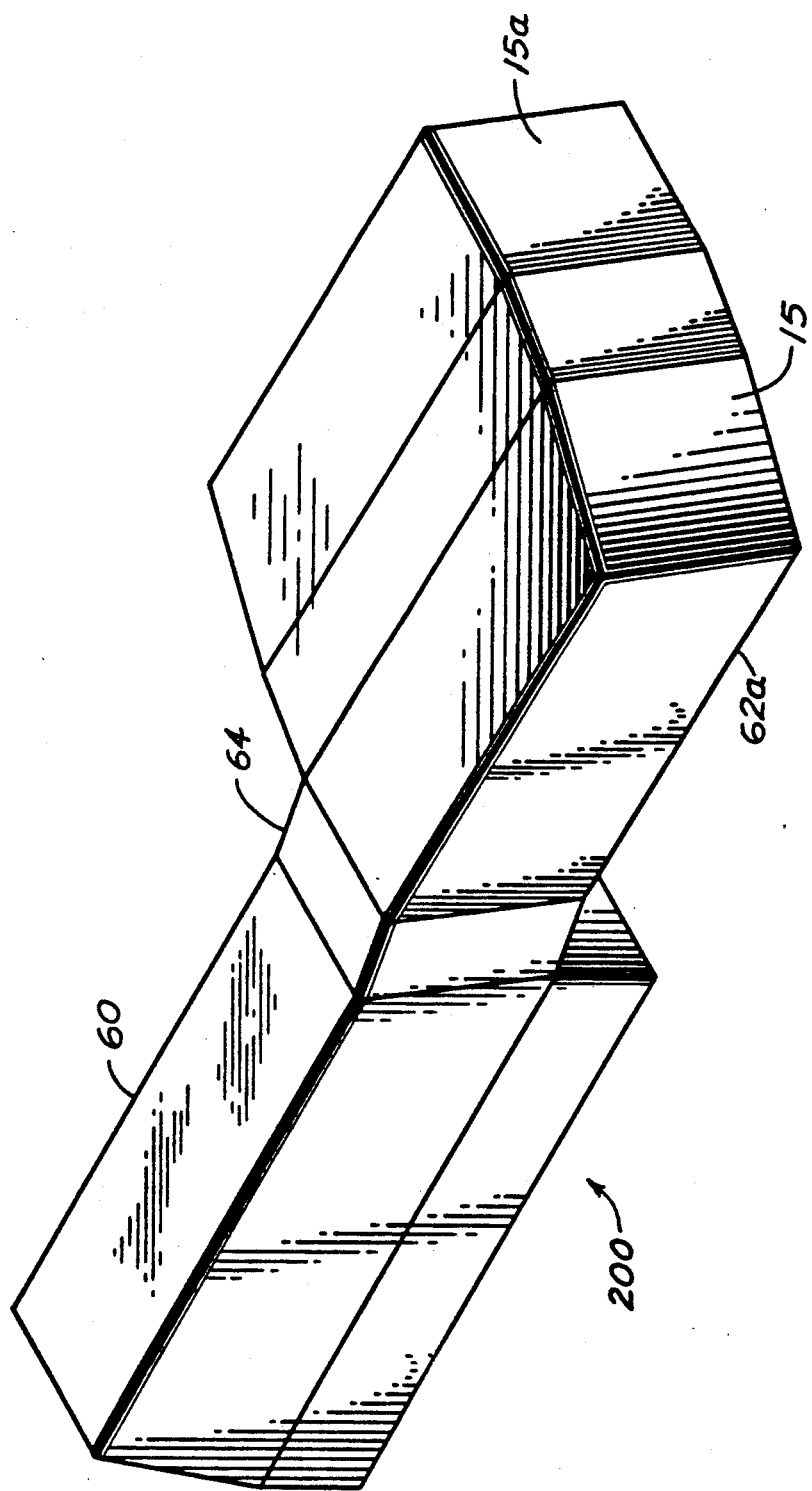

OPTICAL LIGHT BEAM POSITION CONTROL SYSTEM

CROSS REFERENCE TO RELATED APPLICATIONS

This application is a continuation-in-part of copending application Ser. No. 06/812,945, filed Dec. 26, 1985, which is a continuation-in-part of application Ser. No. 06/509,661, filed June 30, 1983, now abandoned.

This invention relates generally to the field of light beam control and to electro-optical light beam control systems. More particularly this invention relates to an electro-optical light beam control system wherein a monitor beam is generated which is used to control the position of a principal beam or controlled beam.

A precisely controlled narrow light beam in accordance with this invention may be used in any application wherein a controlled narrow light beam is required. Examples of applications include television projection, data storage on film, non-contact metrology and inspection, production of integrated and printed circuits, printing with high resolution, beam switching for control of fiber optic inputs, and image analysis.

This invention has application wherever a very small beam size is desirable. The diameter of the beam achievable by this invention is in the order of the wavelength of the light beam itself. This is in the order of 10 times less than that which is achievable by the use of an electron beam.

DESCRIPTION OF THE PRIOR ART

The electro-optical devices and scanners for deflecting light are known in the art. These devices generally depend upon a Kerr cell wherein the index of refraction of a material may be changed by application of an electrical field. U.S. Pat. No. 3,539,244 shows a device wherein control between total internal reflection and passage of light is achieved by the use of an electric field to adjust the material index of refraction. In this device, light is either totally internally reflected or allowed to pass through, thus creating a device which is a switch. The magnitude of the angular deflection of the light is very limited because it is a function only of the change in index of refraction achievable with the Kerr cell.

U.S. Pat. No. 4,343,536 discloses a device for light transmission control which is dependent upon the use of materials wherein the crystal exhibits a variable index of refraction based upon the distribution of the electric field intensity across the crystal. This device uses high frequency voltages such as a saw tooth to increase the deflection within a crystal.

Other examples of light control by the use of electric fields are found in an electro-optical modulator antenna which is described in U.S. Pat. No. 4,243,300 and in a layered light deflection device described in German patent Patenschrift 136,774. In the '300 patent, when interdigital electrode on the face of a crystal is subjected to electric fields between adjacent electrodes, the crystals index of refraction changes in accordance with the linear transverse Pockel's effect. In this device the thin crystal having electrodes substantially covering at least one of its lateral surfaces presents a large aperature modulator/antenna capable of modulating incident optical energy over a wide angle of incidents, for example, up to plus and minus 45 degrees. The light deflection device illustrated in the above referenced German patent is arranged in or on layers adjoining a photoconductive layer which is in the center. Voltage when applied to the electrodes at the top and the bottom of the device changes the index of refraction in all of the layers. This enables light with a specific angle of propagation to be spread.

Devices relying upon magnetic fields to control light are known. Examples are U.S. Pat. No. 4,236,782 Castera et al. and an article entitled "Magnetic Bounce-Cavity Modulator" by Kylau et al., Sept. 15, 1979; Vol. 18, No. 18, *Applied Optics*. In each of these applications light is modulated by the use of magnetic field and a garnet crystal.

U.S. Pat. No. 3,506,334 issued to A. Korpel shows a phased array type beam scanning device in which an electric field changes the index of refraction inside an interferometer.

SUMMARY OF THE INVENTION

This invention uses a Kerr cell in combination with a Lummer-Gehrcke interferometer plate to provide positional control of light beams. When different voltages are applied to the Kerr cell, the Kerr cell index of refraction is changed. At the interface of the Kerr cell and Lummer-Gehrcke interferometer plate the angle of incidence is fixed and the angle of refraction is changed in response to the applied voltage. The Lummer-Gehrcke interferometer plate produces a phased-linear-array of light beams which are dependent on the angle of refraction and thus controllable by the applied voltage.

In this invention the controllable phased-linear-array obtainable from the Kerr cell and Lummer-Gehrcke interferometer plate combination is used to provide a light beam position control system. Light enters the Kerr cell and exits into a first Lummer-Gehrcke interferometer plate. A portion of the light exits the first Lummer-Gehrcke interferometer plate and enters a second Lummer-Gehrcke interferometer plate laying beneath the first. That portion of light which remains in the first Lummer-Gehrcke interferometer plate is used to produce a first phased-linear-array of light beams. That portion entering the second Lummer-Gehrcke interferometer plate is used to produce the second phased-linear-array of light beams. Either one of these phased-linear-arrays may be used as the controlled beam and the other used as a monitor beam which provides for precise control of the controlled beam. The combination of a Kerr cell and the double Lummer-Gehrcke interferometer plates provides a phased-linear-array generator for controlling light in one direction. When it is desired to provide two axis control of a light beam in accordance with this invention, two phased-linear-array generators are coupled together with their control axes at an angle. In the embodiments shown herein the second control axis is orthogonal to the first.

It is a prime object of this invention to provide a precision light beam position control system.

It is an object of this invention to provide a precisely controlled uniaxial light beam position control system.

It is another object of this invention to provide a biaxial light beam position control system.

It is another object of this invention to provide a light beam position control system wherein the angular position of the controlled beam is monitored by measurement of the angular position of a second beam.

It is another object of this invention to provide a light beam control system which is entirely solid state and which is completely motionless with all of its operations being performed electronically.

It is another object of this invention to provide a light beam position control system which exploits basic interference phenomena and has the potential of meeting the limits of the Heisenberg uncertainty principle.

BRIEF DESCRIPTION OF THE DRAWINGS

FIG. 1 shows a perspective view of an optical phased-linear-array generator 14.

FIG. 2 shows a perspective view of an optical dual phased-linear-array generator 14a.

FIG. 2d shows a perspective view of an optical dual phased-matrix-array generator 200.

DESCRIPTION OF THE PREFERRED EMBODIMENTS

FIG. 1 shows a perspective view of an optical single axis light beam position control system. This is the optical phased-linear-array generator 14 in accordance with this invention. Generator 14 converts a converging input pencil of light rays into a linear array of controllable phase related virtual point sources with diverging pencils of light rays that merge into a set of non-localized Tolansky interference fringes. Thus generator 14 is a tunable light beam direction filter.

Figure 1A:
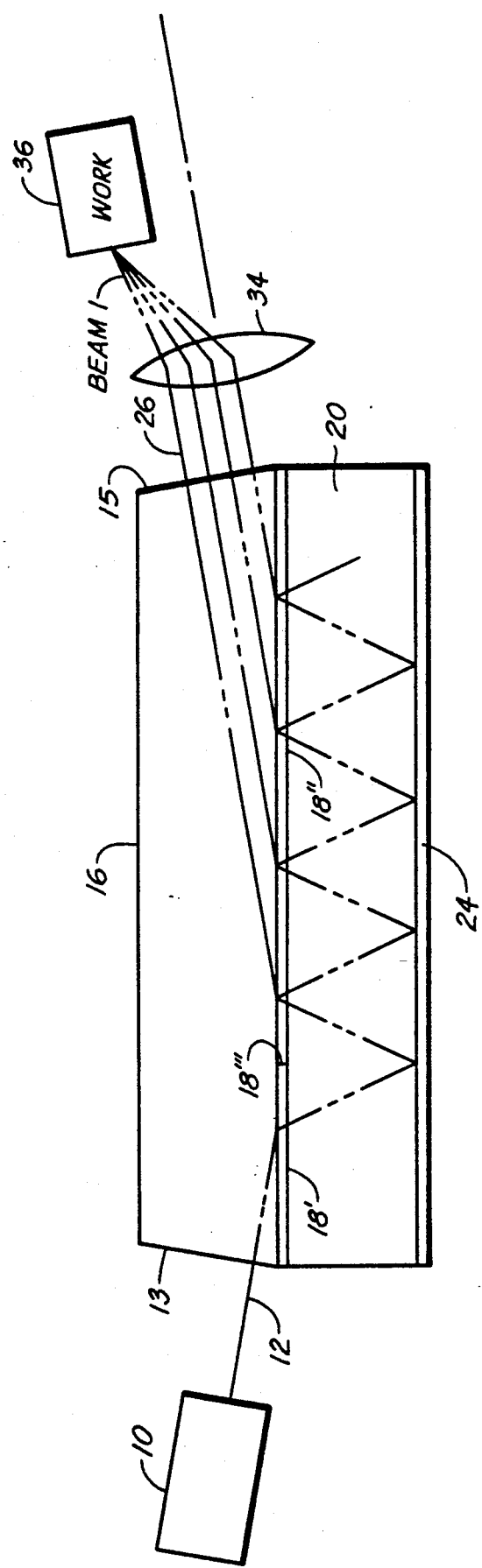
FIG. 1a shows the construction of the generator 14 shown in FIG. 1.

FIG. 1a shows the construction of generator 14. Light source 10 generates the initial pencil of light rays 12 that is the light beam to be controlled in accordance with the principles of this invention. This pencil of light rays in conjunction with the aforesaid diverging pencils of light rays constitute a bundle of light rays. For the purpose of clarity this bundle of light rays will be discussed as a single ray as is the standard practice in discussing interference phenomena. Ray 12 may be generated by any suitable means such as an arc lamp and a lens such that it includes the full spectrum of angles through which the ray is to be controlled. Ray 12 may be a single ray of polarized monochromatic light.

Generator 14 consists of an electro-optical cell 16, a reflection control film 18, a multiple reflection interferometer plate 20 and a total reflection film 24.

Cell 16 is any optical element whose index of refraction can be controlled by an electric or magnetic field. For clarity in this discussion cell 16 is treated as a Kerr cell, which has electric field control plates on each of its quadrilateral faces 17a and 17b as shown in FIG. 1. If cell 16 were a Pockels cell, the electric field control plates could be placed on the top face 19a and the bottom face 19b of generator 14.

To eliminate refraction considerations in the discussion of cell 16, ray 12 is shown entering perpendicular to face 13 and a group of controllable rays of light are shown exiting perpendicular to face 15.

Film 18 is divided into a non-reflecting film 18' and a highly reflecting film 18''. Film 18' permits all of ray 12 from cell 16 to enter plate 20. The highly reflecting film 18'' causes an incident light ray to be divided into a reflected part and a refracted part.

In FIG. 1a there is shown as 18''' a line which denotes the point where film 18 changes from the non-reflecting film 18' to the highly reflecting film 18''. Film 18 has no further functional impact on the operation of generator 14. Because film 18 produces only a minimal uniform and equal displacement and phase shift of all of the rays of light, it does not affect their separation or phase difference.

Plate 20 functions as a "leaky" optical waveguide to produce group 26 which emerges from the top of plate 20 into cell 16.

Film 24 is provided to reflect all light rays incident on the bottom surface of plate 20 in order to enhance the efficiency of the overall operation of generator 14.

As shown in FIG. 1a, the phased-linear-array is the source of the controlled beam output which is shown as beam 1. A lens 34 receives the phased-linear-array, group 26, and merges it into the Tolansky fringes on a work item 36. The Fraunhofer far field of the phased-linear-array is truncated to the focal plane of lens 34. If it is decided to place work 36 in the true far field of the phased-linear-array, then lens 34 is not necessary.

Figure 1B:
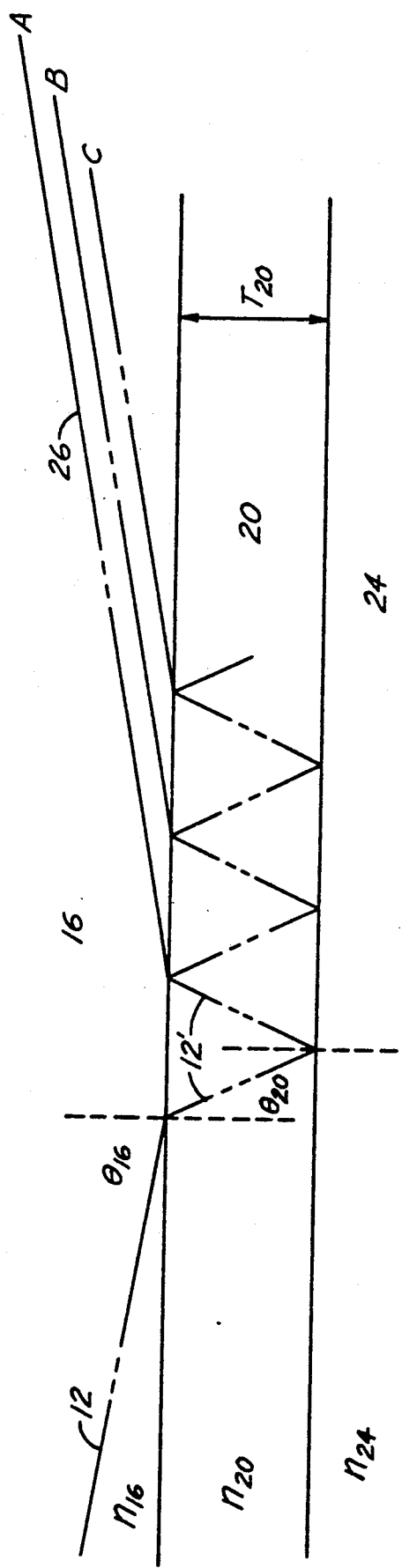
FIG. 1b shows the optical ray trace of the generator 14 shown in FIG. 1.

FIG. 1b shows the optical ray trace of generator 14. As explained above, faces 13 and 15 and film 18 have no direct functional impact on the operation and therefore have been eliminated for purposes of clarity.

In FIG. 1b, $n_{16}$, $n_{20}$, and $n_{24}$ each indicates the respective indices of refraction of the material of cell 16, plate 20, and film 24. Similarly, the angles of the rays in each medium are respectively designated $\theta_{16}$, $\theta_{20}$, and $\theta_{24}$. The relationship between the angles in cell 16 and in plate 20 is given by Snell's law which is:

$$n_{16} \sin \theta_{16} = n_{20} \sin \theta_{20} = n_{22} \sin \theta_{22} = n_{24} \sin \theta_{24} = n_{16a} \sin \theta_{16a} \quad \text{Equation 1}$$

In Equation 1 the other terms $n_{16a}$, $n_{22}$, $\theta_{16a}$ and $\theta_{22}$ are used in further embodiments that will be discussed and defined as they are developed hereinafter.

Since ray 12 is incident on film 18', all of ray 12 is shown entering plate 20 as ray 12'.

When ray 12' is incident on film 24, all of ray 12' is reflected back into plate 20. Ray 12' upon reaching film 18'' is partially refracted into cell 16 and partially reflected back into plate 20. That portion refracted into cell 16 becomes the first ray of group 26 and is shown in FIG. 1b as ray 26A.

Ray 12' continues inside plate 20 where on each contact with film 18" a further subdivision of ray 12' occurs. Progressively less energy is released with each sequential ray that exits from plate 20 into cell 16. In this manner source 10 is regenerated into a line of virtual point sources with geometrically degraded intensities.

The remaining sequential rays can be designated as ray 26B, ray 26C, etc. which are shown in FIG. 1b.

Figure 1D:
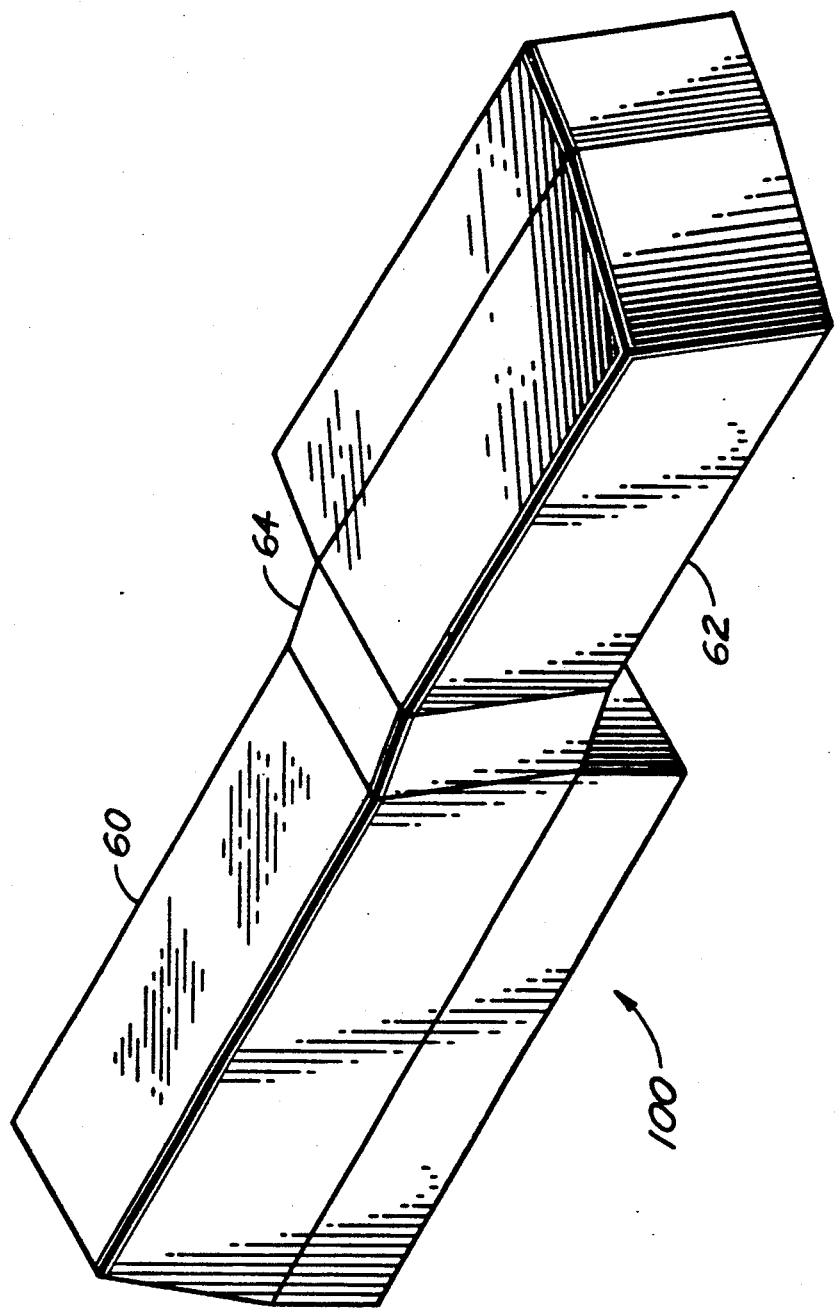
FIG. 1d shows a perspective view of an optical phased-matrix-array generator 100.
Figure 1C:
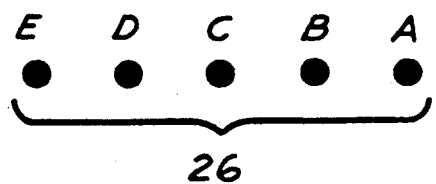
FIG. 1c shows the single phased-linear-array output of the generator 14 shown in FIG. 1.

FIG. 1c shows the first five rays of the phased-linear-array from generator 14 as group 26.

The spacing, $S_{26}$, between sequential rays in group 26 is given by:

$$S_{26} = \frac{2T_{20}n_{16}\sin\theta_{16}\cos\theta_{16}}{\sqrt{n_2^2 - n_{16}^2\sin^2\theta_{16}}} \quad \text{EQUATION 2a}$$

In Equation 2a, $T_{20}$ is the thickness of plate 20 where the other terms are defined above and exhibited in FIG. 1b.

The optical path difference, $D_{26}$, between sequential rays in group 26 is given by:

$$D_{26} = 2T_{20}\sqrt{n_{20}^2 - n_{16}^2\sin^2\theta_{16}} \quad \text{EQUATION 2b}$$

The separation, $H_{26}$, between sequential virtual point sources, in group 26 is given by:

$$H_{26} = \sqrt{D_{26}^2 + S_{26}^2} \quad \text{EQUATION 2c}$$

In operation lens 34 is positioned to intercept group 26 so as to establish two constructive interference fringes in the focal plane of lens 34. One fringe serves as the fiducial point and is positioned at the focal point of lens 34. The second fringe, that is to be used to perform work, is displaced at an angle $\phi$ from the optical axis of lens 34. The angle between the axis of lens 34 and the normal with respect to film 18" on plate 20 is $\theta_{16}$. The angle $\phi$ is given by:

$$\phi = \alpha - \arccos\left[\frac{(M+1)\lambda}{H_{26}}\right] \quad \text{EQUATION 3a}$$

where the optical path difference, $D_{26}$, is an integer, M, multiple of the wavelength, $\lambda$, of the light of ray 12 and $\alpha$ is the angle between the line of virtual point sources and the optical axis of lens 34 which is given by:

$$\alpha = \arctan\left[\frac{S_{26}}{D_{26}}\right] \quad \text{EQUATION 3b}$$

Direction control of beam 1 is accomplished by feeding voltage 44 to the electric field control plates of cell 16 of generator 14. This produces an electrostatic field inside cell 16, causing a change in the index of refraction $n_{16}$. This new index of refraction, $n_{16}'$, is defined as:

$$n_{16}' = n_{16} - \lambda BE^2 \quad \text{Equation 4}$$

In Equation 4, $n_{16}$ is the index of refraction of cell 16 when there is no electric field present; while $n_{16}'$ is the index of refraction of cell 16 in the presence of an electric field, E. Here, B, is the Kerr constant.

When voltage 44 is applied to faces 17a and 17b of generator 14, the electric field reduces $n_{16}$ causing the spacing between sequential rays in group 26 to decrease while the optical path difference between sequential rays increases. The net result is a decrease in the angle at which constructive interference occurs. Stated in alternate terms the constructive interference fringe that is to be used to perform work moves toward the focal point of lens 34.

Calibration of the phased-linear-array generator 14 may be achieved by determining two critical values of the index of refraction of cell 16. The first calibration point occurs when voltage 44 across cell 16 causes $n_{16}$ to be equal to the index of refraction of film 18'. When this occurs, virtually all of ray 12 is reflected from plate 20, thus forming the minimum operating voltage.

A second calibration occurs when $n_{16}$ is reduced to the value where the constructive interference fringe that is to be used to perform work exactly overlays the focal point of lens 34. This is the maximum operating voltage.

FIG. 1d shows a perspective view of an optical dual axis light beam control system. This is the optical phased-matrix-array generator 100. Generator 100 consists of two phased-linear-array generators assembled so that positioning of a bundle of light rays along two axes can be achieved. A first phased-linear-array generator 14, shown as generator 60, is tandem mounted in quadrature to a second phased-linear-array generator 14, shown as generator 62, by means of a phased-array coupler 64. Coupler 64 is an active optical crystal that causes the polarization vectors of the exiting rays to be rotated orthogonal to the polarization vectors of the entering rays.

Figure 1E:
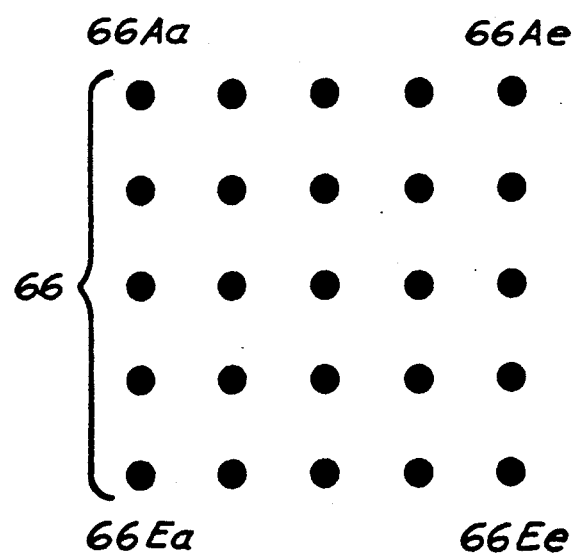
FIG. 1e shows the single phased-matrix-array that is produced by the phased-matrix-array generator shown in FIG. 1d.

Ray 12 enters generator 60 and exits as group 26 shown in FIG. 1c. Group 26 enters generator 62 where each ray is regenerated into a separate phased-linear-array. FIG. 1e shows these combined phased-linear-arrays as the phased-matrix-array group 66 as they exit generator 62.

In FIG. 1e it is assumed that generators 60 and 62 each produces five rays from each input ray. Thus group 66 is produced by ray 12 entering generator 60 where it is regenerated into five rays that are in turn regenerated by generator 62 into twenty-five rays.

Consanguinity of group 66 evolves as follows:

Ray 12 divides into rays 26A, 26B, 26C, 26D, and 26E.
Each of these rays next subdivides as follows;
Ray 26A divides into rays 66Aa, 66Ab, 66Ac, 66Ad, and 66Ae.
Ray 26B divides into rays 66Ba, 66Bb, 66Bc, 66Bd, and 66Be.
Ray 26C divides into rays 66Ca, 66Cb, 66Cc, 66Cd, and 66Ce.
Ray 26D divides into rays 66Da, 66Db, 66Dc, 66Dd, and 66De.
Ray 26E divides into rays 66Ea, 66Eb, 66Ec, 66Ed, and 66Ee.

When generator 100 is used, the output direction is controlled by feeding a voltage 44 to the field control plates of generator 60 and feeding a separate voltage 44a to the field control plates of generator 62. Voltages 44 and 44a are discussed in the following embodiment.

Figure 2:
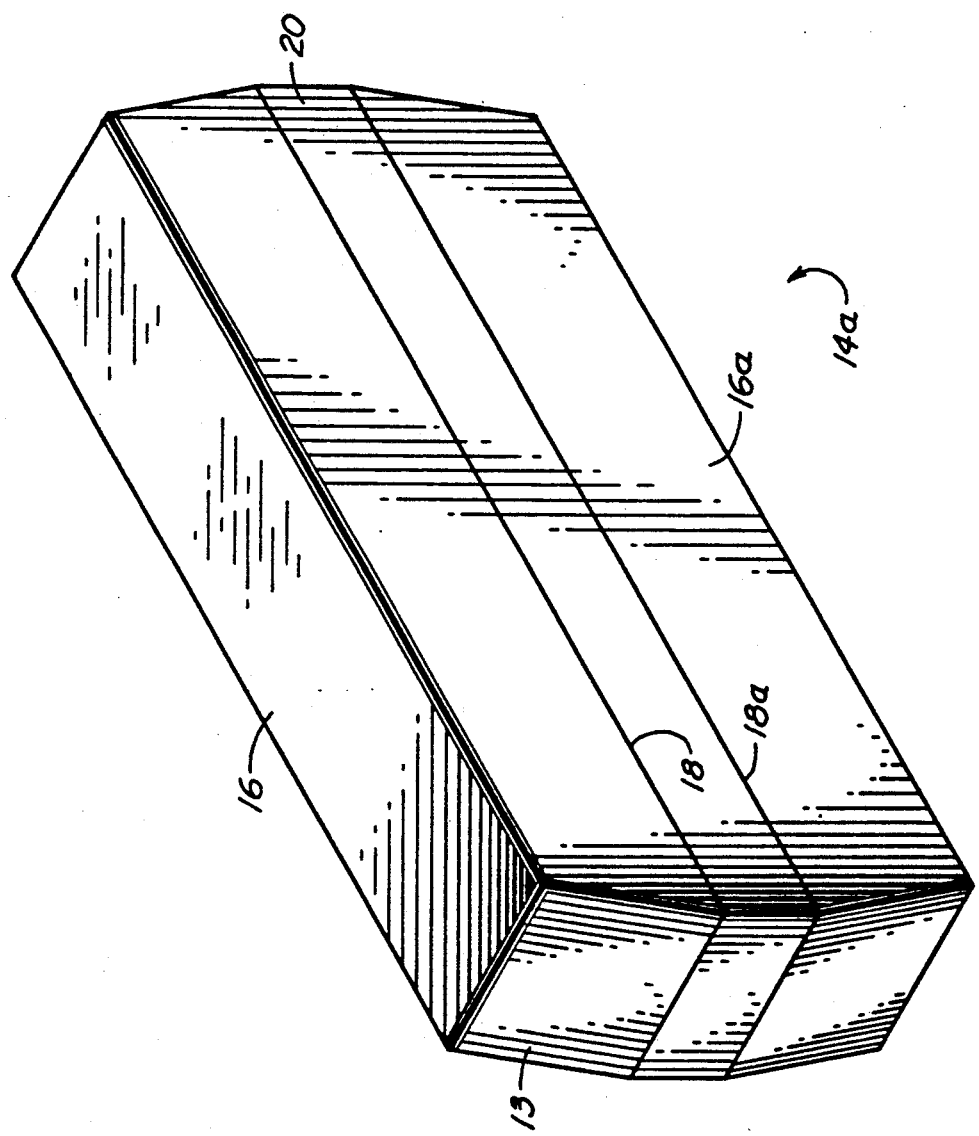

FIG. 2 shows a perspective view of a two beam single axis light beam position control system. This is the optical dual phased-linear-array generator 14a in further accordance with this invention. Generator 14a converts an input pencil of light rays into two groups of controllable phase related virtual point sources with diverging output pencils of light rays which merge into two separate sets of Tolansky fringes. It is through the production of two separate groups of phase related bundles of rays that it is possible to generate two beams: one for use and the other for monitoring purposes.

Figure 2A:
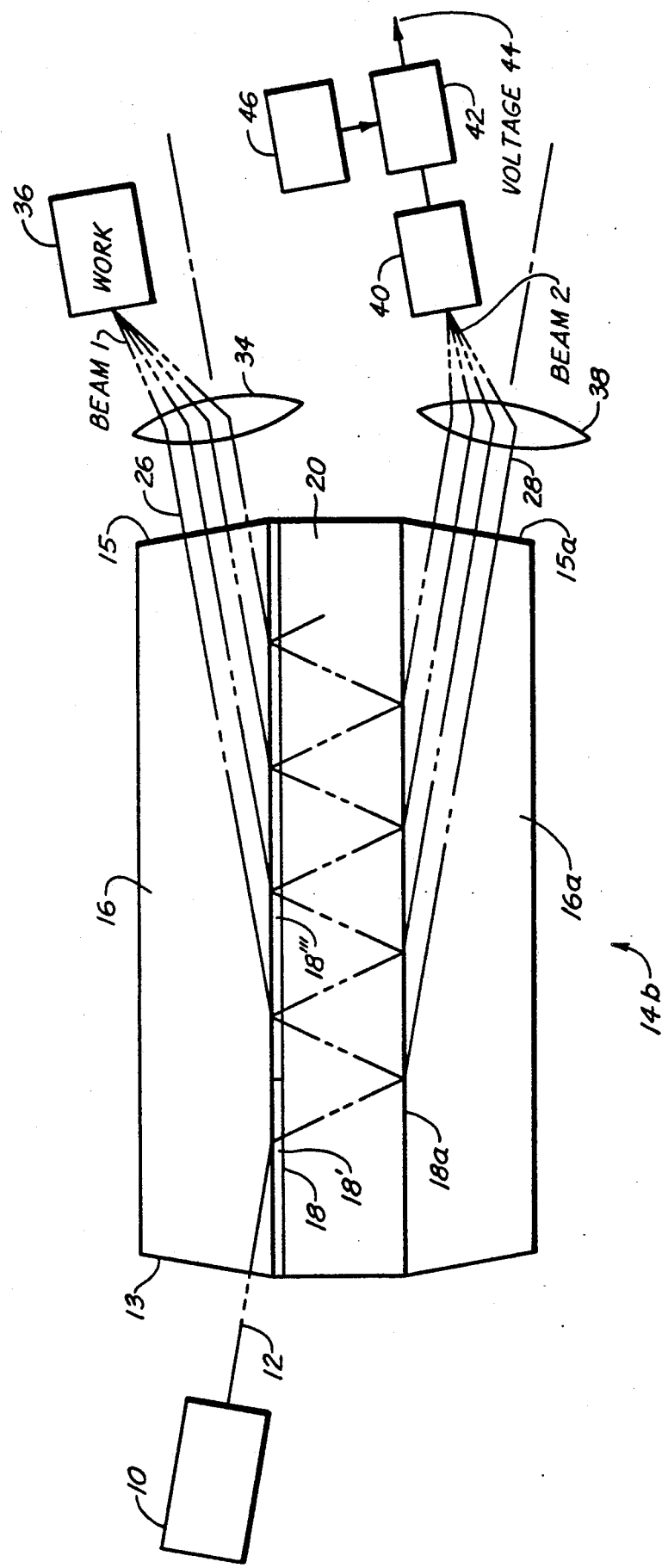
FIG. 2a shows the construction of the generator 14a shown in FIG. 2.

FIG. 2a shows the construction of generator 14a where source 10 and ray 12 were defined above.

Generator 14a consists of cell 16, film 18, and plate 20 as provided for in generator 14. In addition generator 14a contains a second reflection control film 18a and a second electro-optical, or Kerr, cell 16a.

Cell 16, plate 20 and film 18 are the same as described in FIG. 1a.

Film 18a is a highly reflecting film similar to film 18" and functions in the same manner. Film 18a is provided to enable generator 14a to produce the second phased-linear-array or group 28.

Cell 16a which receives group 28 from the bottom of plate 20 has the same electro-optical characteristics as cell 16 and functions in the same manner. Group 28 exits cell 16a perpendicular to face 15a in order not to introduce refraction effects.

As shown in FIG. 2a, the phased-linear-array emerging from the top of plate 20 into cell 16 is group 26. When group 26 emerges from cell 16 it is collected by lens 34, as above, and is merged into the principal beam which is again shown as beam 1. The phased-linear-array emerging from the bottom of plate 20 into cell 16a is group 28. When group 28 emerges from cell 16a, it is collected by lens 38, which functions in the same manner as lens 34, to merge the phased-linear-array into the monitor beam or beam 2.

Lens 38, image analysis means 40, controller 42 and control 46 in combination comprise an output controller for use in monitoring the output of generator 14a. Clearly either group 28 or group 26 may be used as a principal beam that performs useful work, while the other may be used as a monitor beam to determine the precise position of the work performing principal beam. Stated another way, work 36 and the means for generating control signals may be placed in the path of group 26 or group 28.

Figure 2B:
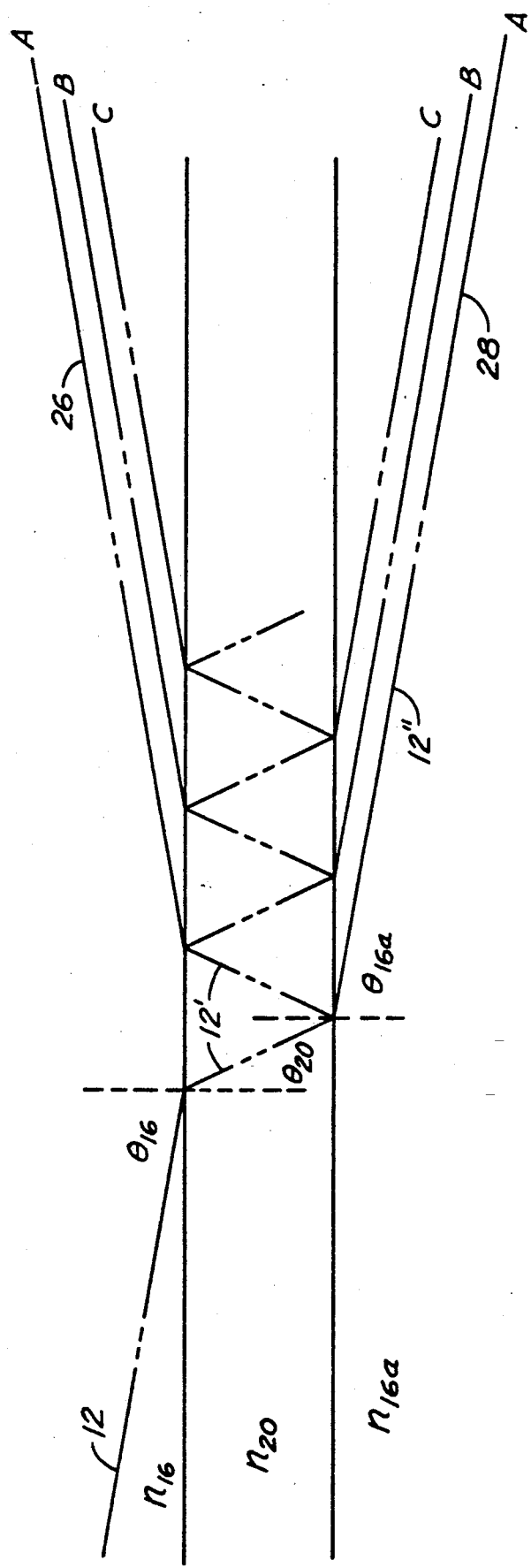
FIG. 2b shows an optical ray trace of the generator 14a shown in FIG. 2.

FIG. 2b shows the optical ray trace associated with generator 14a. As explained above, faces 13, 15 and 15a as well as films 18 and 18a have no direct functional impact on the operation and therefore have been eliminated for clarity.

In FIG. 2b, $n_{16}$, $n_{20}$, and $n_{16a}$ each indicates the respective indices of refraction of the material of cell 16, plate 20, and cell 16a. Similarly, the angles of the rays in each medium are respectively designated $\theta_{16}$, $\theta_{20}$, and $\theta_{16a}$. These relationships have been defined in Equation 1 above.

In generator 14a ray 12 enters plate 20 as ray 12' in the same manner as in generator 14.

When ray 12' is incident on the 18a, a part is refracted into cell 16a while the remaining part is reflected back into plate 20. That part refracted into cell 16a becomes the first ray 28A of the group of rays which comprise group 28. Ray 12' upon reaching film 18" is partially refracted into cell 16 and partially reflected back into plate 20. That part refracted into cell 16 becomes the first ray 26A of group 26.

Ray 12' continues inside plate 20 where on each contact with either film 18" or film 18a further subdivision of ray 12' occurs. Rays exiting plate 20 can be sequentially designated as rays 28B, 26B, 28C, 26C, etc. as shown in FIG. 2b.

Figure 2C:
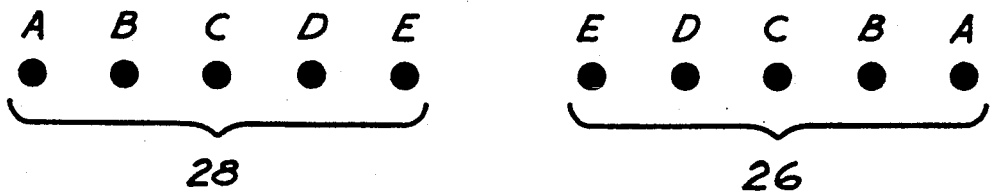
FIG. 2c shows the two phased-linear-array outputs of the generator 14a shown in FIG. 2.

FIG. 2c shows the first five rays in the phased-linear-arrays of groups 26 and 28 from generator 14a.

The spacing, $S_{26}$, and the optical path difference, $D_{26}$, are the same as defined for generator 14 in Equations 2a and 2b above.

The spacing, $S_{28}$, between sequential rays in group 28 is given by:

$$S_{28} = \frac{T_{20} n \sin\theta_{16} \sqrt{n_{16a}^2 - n_{16}^2 \sin^2\theta_{16}}}{n_{16a} \sqrt{n_{20}^2 - n_{16}^2 \sin^2\theta_{16}}} \quad \text{EQUATION 5}$$

In Equation 5 all of the terms have been defined above with their relationships exhibited in FIG. 2b.

The optical path difference, $D_{28}$, between sequential rays in group 28 is given by Equation 2b above.

Group 28 is merged by lens 38 into beam 2 on image analysis means 40. Means 40 produces a unique signal which is a function of the position of beam 2 in the focal plane of lens 38. This unique signal is transmitted to controller 42 which produces voltage 44 that is related to this position. Voltage 44 is then applied to the field control plates of generator 14 where it simultaneously controls the indices of refraction of cells 16 and 16a. Through controlling these indices of refraction the separation and optical path difference of both group 26 and group 28 are simultaneously changed. This results in the simultaneous change in the angle at which constructive interference occurs in both beam 1 and beam 2. Thus through detection of the position of beam 2, it is known where beam 1 is at all times. Means 40 may be a television camera in which the unique signal can be the lapsed time between when the electron beam sweep starts and beam 2 is detected.

Voltage controller 42 also includes a control 46 which may be varied either manually or electronically to insert into controller 42 a desired position of beam 2. Controller 42 then adjusts voltage 44 so that the output of means 40 is in agreement with the output of control 46. In this manner, the position of beam 2 is controlled through the feedback loop which includes voltage 44 applied to cells 16 and 16a. The position of beam 1 can therefore be controlled because the position of beam 2 is precisely controlled. In this manner, the incident point of beam 1 on work 36 is precisely controlled.

Calibration of the optical phased-linear-array generator 14a may be achieved in the same manner as was generator 14.

FIG. 2d shows a perspective view of an optical two beam dual axis light beam control system. This is the optical dual phased-matrix-array generator 200. Generator 200 consists of two phased-linear-array generators assembled so as to control a light beam in two axes. In this embodiment generator 14 is again shown as generator 60 and is tandem mounted in quadrature to generator 14a, shown as generator 62a, by means of an optical coupler 64.

Figure 2E:
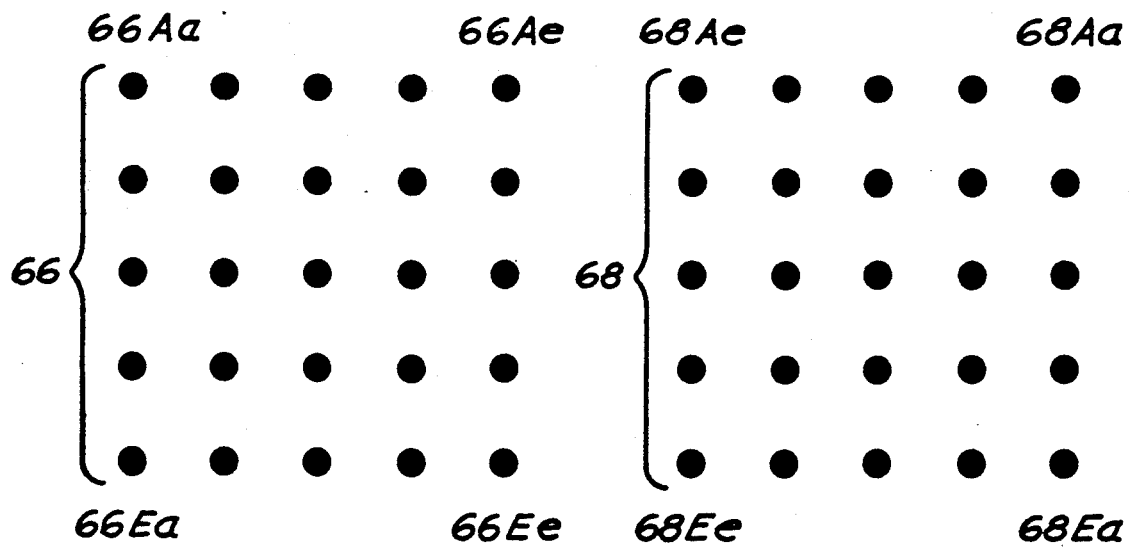
FIG. 2e shows the two phased-matrix-arrays that are produced by the dual phased-matrix-array generator shown in FIG. 2d.

Ray 12 enters generator 60 and exits as group 26, shown and described in FIG. 1c. Group 26 enters generator 62a where each entering ray is regenerated into two separate phased-linear-arrays. FIG. 2e shows these two sets of combined phased-linear-arrays as the phased-matrix-arrays group 66 and group 68 that exit generator 62a.

FIG. 2e is based on generator 60 producing five rays for each input ray and generator 62a producing two sets of five rays each for every input ray. Thus groups 66 and 68 are produced by ray 12 entering generator 60 where it is regenerated into five rays that are in turn regenerated by generator 62a into two sets of twenty-five rays each. Specifically group 66 encompasses those rays exiting from face 15 of generator 62 and group 68 encompasses those rays exiting from face 15a.

Consanguinity of groups 66 and 68 evolves as follows: Ray 12 divides into the rays 26A, 26B, 26C, 26D, and 26E.

Each of these rays next subdivides as follows;
Ray 26A divides into rays 66Aa, 66Ab, 66Ac, 66Ad, and 66Ae and into rays 68Ae, 68Ad, 68Ac, 68Ab, and 68Aa.
Ray 26B divides into rays 66Ba, 66Bb, 66Bc, 66Bd, and 66Be and into rays 68Be, 68Bd, 68Bc, 68Bb, and 68Ba.
Ray 26C divides into rays 66Ca, 66Cb, 66Cc, 66Cd, and 66Ce and into rays 68Ce, 68Cd, 68Cc, 68Cb, and 68Ca.
Ray 26D divides into rays 66Da, 66Db, 66Dc, 66Dd, and 66De and into rays 68De, 68Dd, 68Dc, 68Db, and 68Da.
Ray 26E divides into rays 66Ea, 66Eb, 66Ec, 66Ed, and 66Ee and into rays 68Ee, 68Ed, 68Ec, 68Eb, and 68Ea.

When generator 200 is used, the output controller employs a modified version of controller 42 used by generator 14a. These modifications include means 40 having a dual output with two controllers 42 and 42a and two controls 46 and 46a. Here means 40 produces two unique signals which are functions of the two dimensional position of beam 2 in the focal plane of lens 38. The first signal could be the horizonal position which is transmitted to controller 42 to produce voltage 44. The second signal could be the vertical position which would be transmitted to controller 42a to produce the voltage 44a. Voltage 44 could be fed to the field control plates of generator 60 and voltage 44a would then be fed to the field control plates of generator 62a. It is clear that the first signal could be the vertical position which becomes voltage 44 and the second signal could be the horizontal position which becomes voltage 44a.

In this configuration controls 46 and 46a may be varied either manually or electronically to insert into controllers 42 and 42a a desired two dimensional position of beam 2. Controllers 42 and 42a then adjust voltages 44 and 44a so that the output of means 40 is in agreement with the input of controls 46 and 46a. Now the position of beam 2 is controlled through the dual feedback loops which include voltage 44 applied to generator 60 and voltage 44a which is applied to generator 62a. The position of beam 1 now can be precisely controlled in two dimensions because the position of beam 2 is precisely controlled in two dimensions.

Figure 3:
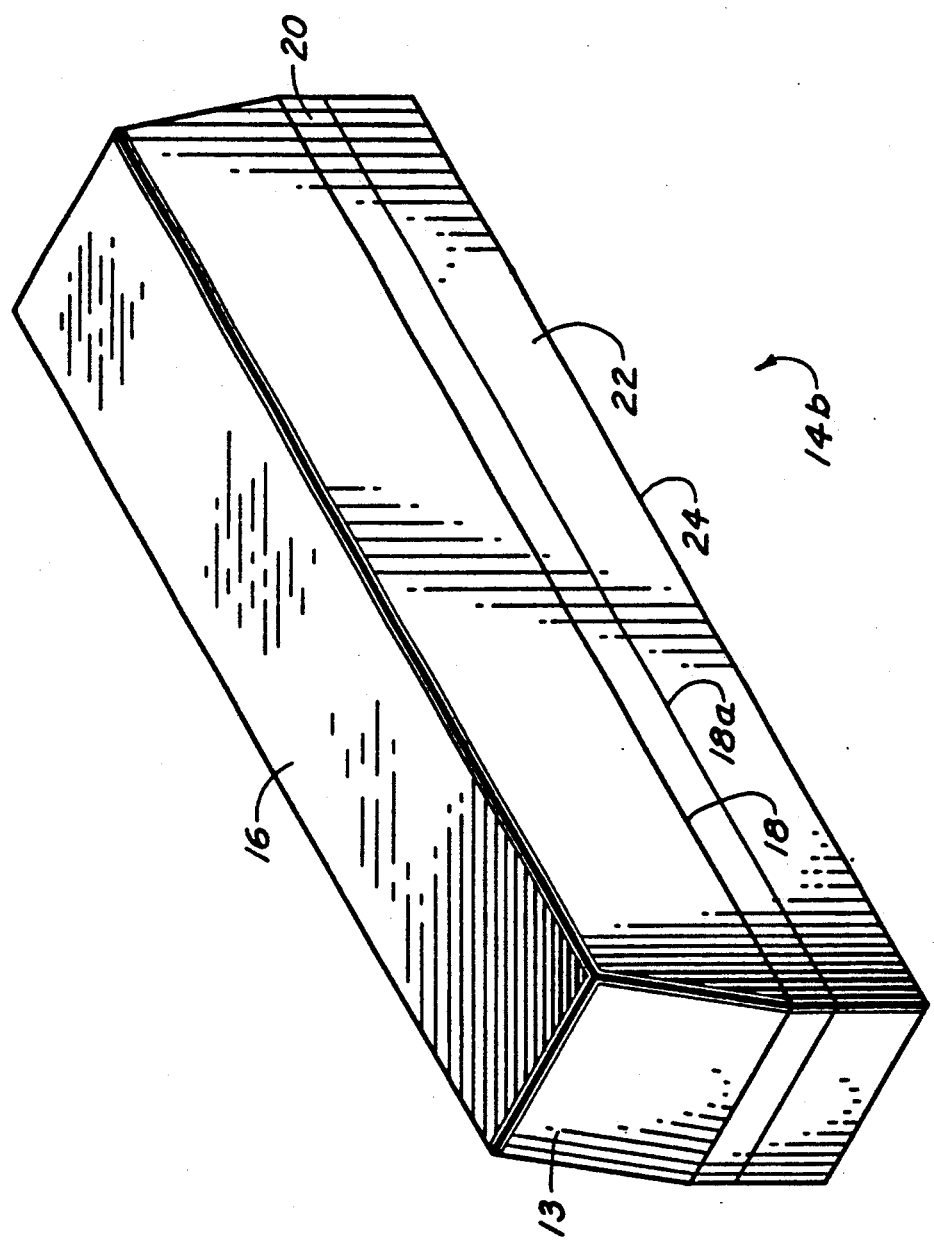
FIG. 3 shows a perspective view of an optical multiplex phased-linear-array generator 14b.

FIG. 3 shows a perspective view of an optical multiplex single axis light beam position control system. This is the optical multiplex phased-linear-array generator 14b. Generator 14b is an alternate means of converting an input pencil of light rays into two groups of controllable phase related pencils of light rays which merge into two separate sets of Tolansky fringes. These two sets of fringes are used in the same manner as those from generator 14a.

Figure 3A:
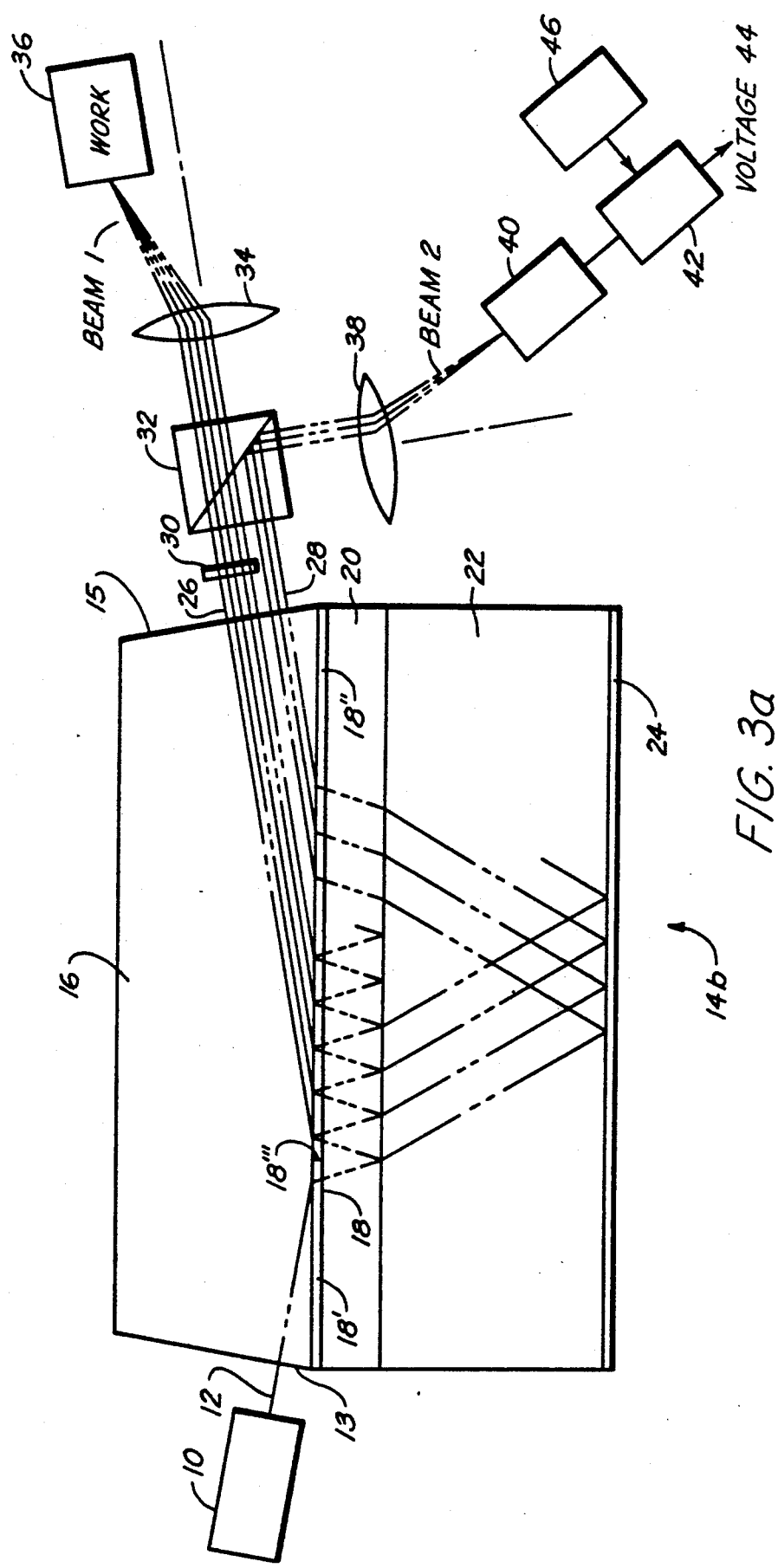
FIG. 3a shows the construction of the generator 14b shown in FIG. 3.

FIG. 3a shows the construction of generator 14b where source 10 and ray 12 were defined above.

Generator 14b consists of cell 16, film 18, plate 20 and the second reflection control film 18a as provided for in generator 14a and a third reflection control film 24 as provided for in generator 14. In addition generator 14b contains a second multiple reflection interferometer plate 22.

Cell 16, plate 20 and films 18 and 18a are the same as described in FIG. 2a. Film 24 is the same as described in FIG. 1a.

Plate 22 is provided as a means of creating a second set of light ray inputs into plate 20. While plate 22 is similar in construction to plate 20, it is thicker so as to facilitate separating the two groups.

Crystal 30 and beam splitter 32 are provided to dissect the multiplex phased-linear-array into two sets of phased-linear-arrays.

As shown in FIG. 3a, the two sets of phased-linear-arrays emerging from the top of plate 20 into cell 16 are the multiplex phased-linear-array. The first set to emerge from plate 20 is designated as group 26 and the second set is designated as group 28. Group 26 is intercepted by crystal 30 which causes its polarization vectors to be rotated orthogonal to the polarization vectors of group 28. The total multiplex phased-linear-array is then transmitted through the polarization beam splitter 32 where the propogation vectors of group 28 are deflected at an angle with respect to that of group 26. When groups 26 and 28 emerge from beam splitter 32, they are collected by lenses 34 and 38 respectively. Lenses 34 and 38 function in the same manner as described in FIG. 2a in which group 26 is merged into beam 1 and group 28 is merged into beam 2.

Lens 38, image analysis means 40, controller 42 and control 46 again comprise the output controller used in monitoring the output of generator 14b. Here again either group 28 or group 26 may be used as the principal beam while the other is used as the monitor beam.

Figure 3B:
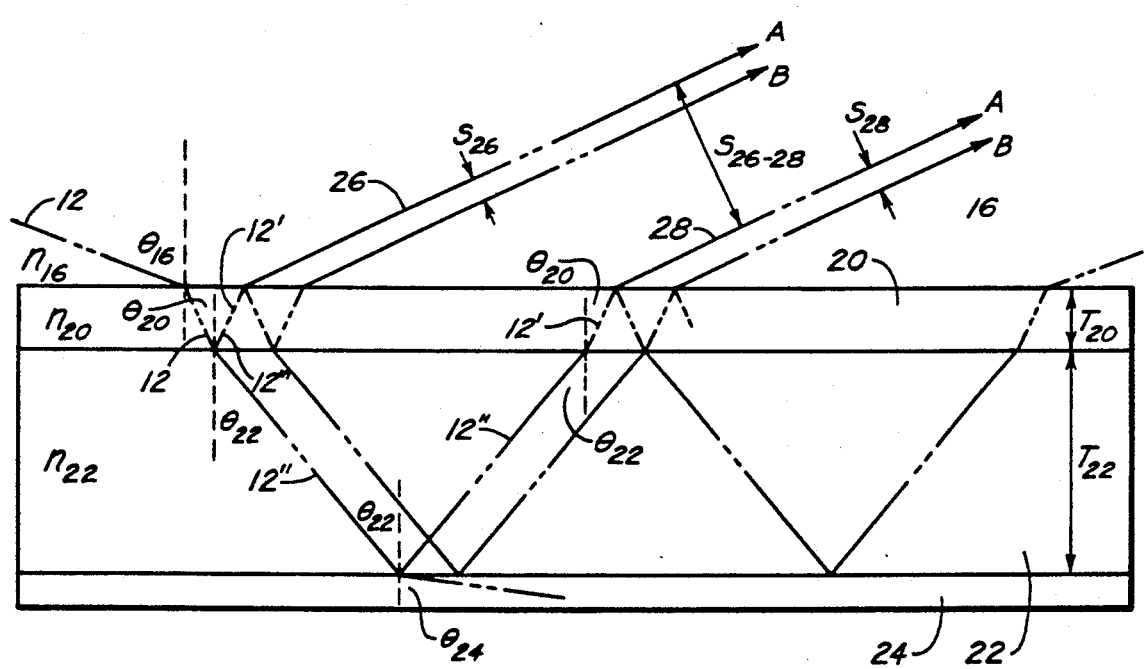
FIG. 3b shows an optical ray trace of the generator 14b shown in FIG. 3.

FIG. 3b shows the optical ray trace associated with generator 14b. As explained above, faces 13 and 15 as well as films 18 and 18a have no direct functional impact on the operation and again have been eliminated for clarity.

In FIG. 3b, $n_{16}$, $n_{20}$, and $n_{22}$ each indicates the respective indices of refraction of the material of cell 16, plate 20, and plate 22. Similarly, the angles of the rays in each medium are respectively designated $\theta_{16}$, $\theta_{20}$, and $\theta_{22}$. The relationships have been defined in Equation 1 above.

In generator 14b ray 12 totally enters plate 20 as ray 12' in the same manner as in generator 14.

When ray 12' is incident on film 18a, a part is reflected back into plate 20 while the remaining part is refracted into plate 22 as ray 12''. When the reflected ray 12' reaches film 18'', it is partially refracted into cell 16 and partially reflected back into plate 20. That part refracted into cell 16 becomes the first ray 26A of the group of beams which comprise group 26. When ray 12' again reaches film 18a, a part is refracted into plate 22 while the remaining part is reflected back into plate 20 to continue the process. Those rays refracted into plate 22 are reflected by film 24 back toward film 18a where each ray is partially refracted into plate 20 and partially reflected back to film 24, thus repeating this process. Each of these rays, upon reentering plate 20, performs in the same manner as did ray 12' above. The first ray refracted into plate 22 from ray 12' becomes the first ray 28A of group 28.

Ray 12' continues inside plate 20 where on each contact with either film 18" or film 18a further subdivision of ray 12' occurs. Those rays derived from ray 12' are shown exiting plate 20 first and can be sequentially designated as rays 26B, 26C, etc. Those rays derived from the rays refracted into plate 22 are shown exiting plate 20 second and can be sequentially designated as rays 28B, 28C, etc. All of these are shown in FIG. 3b.

Figure 3D:
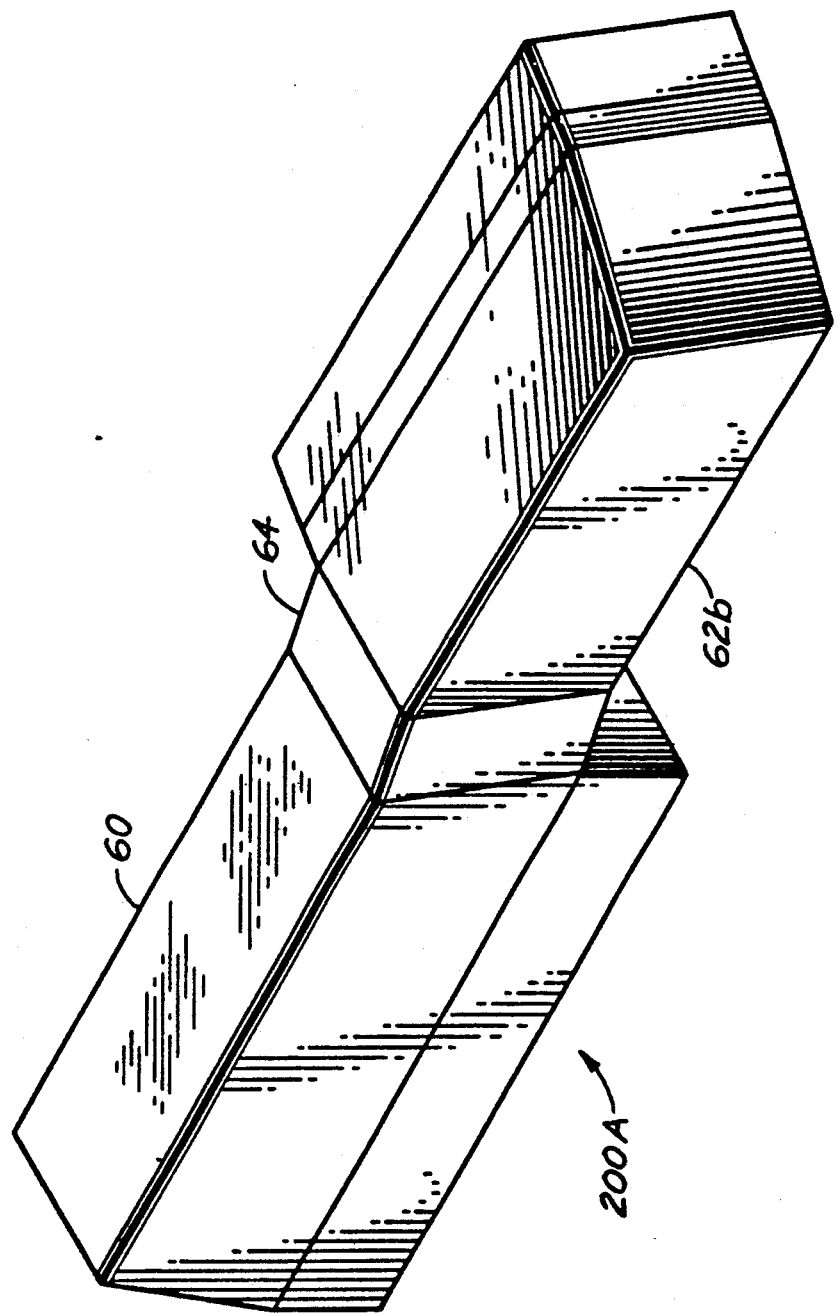
FIG. 3d shows a perspective view of an alternate optical dual phased-matrix-array generator 200A.
Figure 3C:
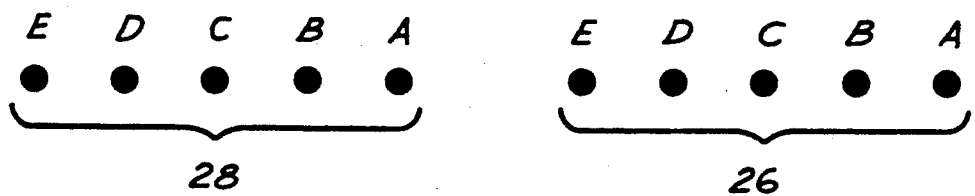
FIG. 3c shows the multiplex phased-linear-array output of the generator 14b shown in FIG. 3.

FIG. 3c shows the first five rays in the phased-linear-arrays of groups 26 and 28 from generator 14b.

The spacing, $S_{26}$, and the optical path differences, $D_{26}$ and $D_{28}$, between sequential rays in group 26 and group 28 are given in Equations 2a, 2b, and 5 respectively.

Here again group 28 is merged by lens 38 into beam 2 on means 40 which produces the signal that enables controller 42 to produce voltage 44. Voltage 44 is then applied to the field control plates of generator 14b where it controls the index of refraction of cell 16, thus affecting the separations and optical path differences between sequential rays of group 26 and group 28. Through controlling one index of refraction, the optical path difference and separation of the sequential beams of both group 26 and group 28 are simultaneously changed exactly the same amount. This results in the simultaneous change in the angle at which constructive interference occurs in both beam 1 and beam 2. Again the position of beam 1 is determined from the position of beam 2.

Voltage controller 42 and control 46 function as in generator 14a.

Calibration of the optical phased-linear-array generator 14b may be achieved in the same manner as was generator 14.

If the full multiplex phased-linear-array, groups 26 and 28, is collected by lens 34, a multiplex linear array of Tolansky fringes will be produced on work 34. These multiplex fringes are functionally related to the thickness of both plate 20 and plate 22.

FIG. 3d shows a perspective view of an alternate optical two beam dual axis light beam control system. This is the optical dual phased-matrix-array generator 200A. Generator 200A consists of two optical phased-linear-array generators assembled so as to provide an alternate means of controlling a light beam in two axes. In this embodiment generator 14 is again shown as generator 60 and is tandem mounted in quadrature to generator 14b which is shown as generator 62b, by means of optical coupler 64.

Figure 3E:
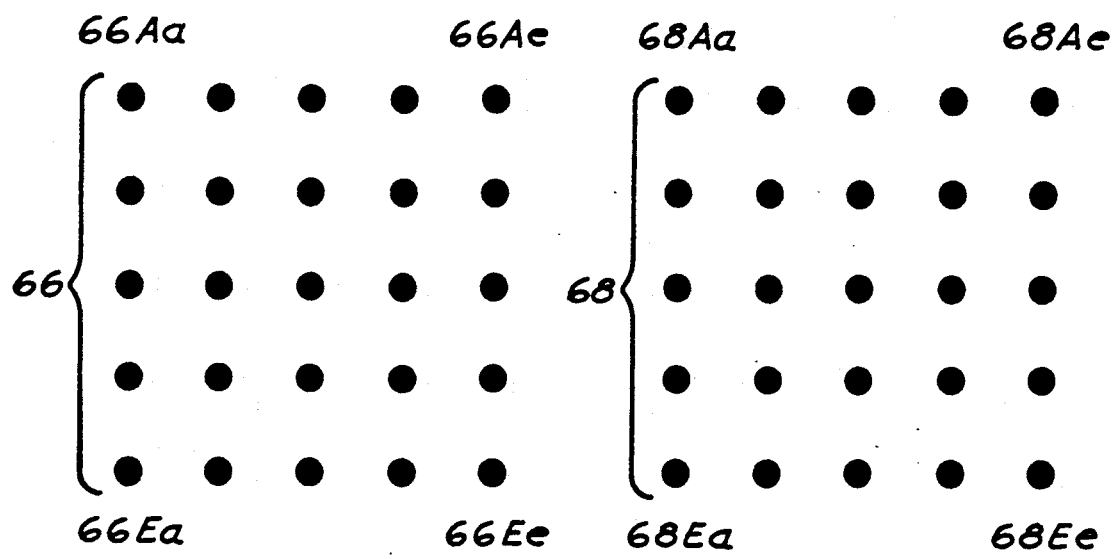
FIG. 3e shows the dual phased-matrix-array that is produced by the generator shown in FIG. 3d.

Ray 12 enters generator 60 and exits as group 26, shown and described in FIG. 1c. Group 26 enters generator 62b, which functions as described above for generator 14b, where each entering ray is regenerated into a first phased-linear-array and a second phased-linear-array. The first phased-linear-array is in a first set of arrays and the second phased-linear-array is in a second set of arrays. FIG. 3e shows this first set of arrays as the phased-matrix-array group 66 and the second set of arrays as the phased-matrix-array group 68.

FIG. 3e is based on the generator 60 producing five rays for each input ray and generator 62b producing two sets of five rays each for each input ray. Thus groups 66 and 68 are produced by ray 12 entering generator 60 where it is regenerated into five rays that are each in turn regenerated by generator 62b into two sets of twenty-five rays each.

Consanguinity of groups 66 and 68 evolves as follows:

Ray 12 divides into the rays 26A, 26B, 26C, 26D, and 26E.

Each of these rays next subdivides as follows;

Ray 26A divides into rays 66Aa, 66Ab, 66Ac, 66Ad, and 66Ae and into rays 68Aa, 68Ab, 68Ac, 68Ad, and 68Ae.

Ray 26B divides into rays 66Ba, 66Bb, 66Bc, 66Bd, and 66Be and into rays 68Ba, 68Bb, 68Bc, 68Bd, and 68Be.

Ray 26C divides into rays 66Ca, 66Cb, 66Cc, 66Cd, and 66Ce and into rays 68Ca, 68Cb, 68Cc, 68Cd, and 68Ce.

Ray 26D divides into rays 66Da, 66Db, 66Dc, 66Dd, and 66De and into rays 68Da, 68Db, 68Dc, 68Dd, and 68De.

Ray 26E divides into rays 66Ea, 66Eb, 66Ec, 66Ed, and 66Ee and into rays 68Ea, 68Eb, 68Ec, 68Ed, and 68Ee.

When generator 200A is used, the beam array output controller functions in the same manner as the controller used by generator 200 as discussed above.

I claim:

1. An optical light beam position control system for controlling the position of a light beam in a plurality of directions comprising in combination:
   a) means for generating a beam of light;
   b) a first optical phased linear array generator having an input which receives said beam of light, having an output, and which is responsive to a first control signal;
   c) an optical phased array beam coupler having an input connected to said first optical phased linear array generator output, and having an output;
   d) a second optical phased linear array generator having an input which is connected to said optical phased array beam coupler output, having an output, and which is responsive to a second control signal;
   e) an optical beam array output controller for monitoring said second optical phased linear array generator output and for generating said first and second control signals;
   wherein said first and second optical phased linear array generators each comprises a first Lummer-Gehrcke plate for generating controlled light beam arrays, and a second Lummer-Gehrcke plate for generating monitor light beam arrays.

2. The apparatus of claim 1, wherein said optical beam array output controller comprises:
   a) matrix array coupler means for rotating the polarization vectors of one of the output or monitor beam arrays;
   b) a controlled beam output means for transmitting said controlled beam to said output;
   c) a monitor beam monitoring means for generating said first and second control signals; and
   d) a beam splitter means for directing said monitor beam to said monitor beam output system, and for directing said controlled beam to said control beam output system.

3. The apparatus of claim 1, wherein said first and second optical phased linear array generators each comprise in combination a Kerr cell means which is voltage controlled and a double Lummer-Gehrcke plate means for generating said output and monitor beam arrays.

4. The apparatus of claim 1, wherein said optical beam array controller includes an image analysis means for receiving said monitor beam arrays including a television camera and means for generating said first and second control signals.

5. The apparatus of claim 1, wherein said optical beam array output controller comprises an optical interference maximum fringe counter and digital counting means for determining monitor beam position.

6. The apparatus of claim 3, further comprising a reflection control coating located between said Kerr cell means and said Lummer-Gehrcke plate means.

7. An optical light beam control system having a controlled beam output and a monitor beam output comprising in combination;
a) means for generating a beam of light;
b) cell means having a controllable refraction index, having a first face for receiving said beam of light and a second face for transmitting light;
c) a first substrate for producing an output light beam array having first face on said cell means second face, and having a second face;
d) a second substrate layer for producing a monitor light beam array having a first face on said first substrate second face; and
e) wherein said second substrate transmits said monitor beam array to said first substrate and wherein said first substrate transmits both said output beam and monitor beams to said refraction index controlled cell, and wherein said controlled cell transmits said output and monitor arrays to an output.

8. The apparatus of claim 7, further comprising an output control means for receiving said monitor beam and for generating a control signal responsive to said monitor beam.

9. The apparatus of claim 7, wherein said output further includes means for separating said output beam and said monitor array beam.

10. The apparatus of claim 7, wherein said cell means is a Kerr cell which is voltage controlled.

11. The apparatus of claim 7, wherein said first and second substrates are Lummer-Gehrcke plates.

12. The apparatus of claim 7, wherein said output means includes means for directing said output light beam array.

13. The apparatus of claim 7, wherein said output and monitor light beam arrays are each linear arrays of N phase related beams of light.

14. An optical light beam position control system having an input and output comprising in combination;
a) means for generating a pencil of light rays;
b) a Lummer-Gehrcke plate which receives said pencil of light rays and which produces a phased linear array of pencils of light rays which in turn produces interference fringes in the far field of said plate;
c) a Kerr cell having a controllable index of refraction and having one face adjacent to said Lummer-Gehrcke plate so as to receive said phased linear array of pencils of light rays which in turn transmits said phased linear array of pencils of light rays to said far field of said Lummer-Gehrcke plate;

whereby the index of refraction of said Kerr cell produces at the interface of said Kerr cell and said Lummer-Gehrcke plate an angle of refraction which is a function of the angle of incidence and the index of refraction of said Kerr cell and said Lummer-Gehrcke plate; and
d) means for controlling the voltage across the said Kerr cell means thereby causing a change in said Kerr cell index of refraction that in turn changes said angle of refraction which then changes the position of said interference fringes in said far field.

15. An optical light beam control system having an input and an output comprising in combination;
a) means for generating a beam of light;
b) a first Kerr cell means for receiving said beam of light;
c) a reflection controlling film located on one surface of said first Kerr cell means;
d) a Lummer-Gehrcke plate having a first face located next to said reflection controlling film, and having a second face;
e) a highly reflecting film located on said second face of said Lummer-Gehrcke plate; and
f) a second Kerr cell located next to said highly reflecting coating
wherein said light passes into said first Kerr cell, and into said Lummer-Gehrcke plate, and
wherein said Lummer-Gehrcke plate provides principal and monitor beam arrays which pass out through said first Kerr cell means and said second Kerr cell means, respectively.

16. The apparatus of claim 15, wherein said first and second Kerr cells are cell means having a voltage controllable index of refraction.

17. The apparatus of claim 15, wherein said reflection controlling film has a first part for transmitting all of said beam of light from said first Kerr cell means to said Lummer-Gehrcke plate and a second part for transmitting part of said light from said Lummer-Gehrcke plate to said first Kerr cell means and reflecting part of said light back into said Lummer-Gehrcke plate.

18. The apparatus of claim 6, wherein said reflection control coating comprises a non-reflecting coating and a highly reflecting coating.

19. The apparatus of claim 18, wherein said non-reflecting coating directs all light from the incident beam into said Lummer-Gehrcke means.

20. The apparatus of claim 15, wherein said Lummer-Gehrcke plate is an optical substrate.

21. An optical light beam position control system for monitoring and controlling the position of a light beam in a plurality of directions comprising in combination;
a) means for generating a beam of light;
b) a first optical phased linear array generator having an input which receives said beam of light, having an output, and which is responsive to a first voltage;
c) an optical phased array beam coupler having an input connected to said first optical phased linear array generator output, and having an output;
d) a second optical phased linear array generator having an input which is connected to said optical phased array beam coupler output, having a first output and a second output, and which is responsive to a second voltage;
e) an optical beam array output image analyser for monitoring one of said second optical phased linear array generator outputs and for generating said first and second voltages wherein said first optical phased linear array generator comprises a first electro-optical element means and a first optical substrate means for generating a first controlled light beam array, and wherein said second optical phased linear array generator comprises a second electro-optical element means connected to the obverse face of a second optical substrate mean for generating a second controlled light beam array and a third electro-optical element connected to the reverse face of said second optical substrate for generating a third controlled light beam array.

22. The apparatus of claim 21, wherein said first, second, and third electro-optical element means are Kerr cells having a voltage controllable index of refraction.

23. The apparatus of claim 21, wherein said first, second, and third electro-optical element means are Pockels cells having a voltage controllable index of refraction.

24. The apparatus of claim 21, wherein said first and second optical substrate means are optical films.

25. The apparatus of claim 21, wherein said first and second optical substrate means are Lummer-Gehrcke plates.

26. The apparatus of claim 21, wherein said first optical phased linear array generator comprises said first electro-optical element means coupled to an optical substrate means by a reflection controlling film.

27. The apparatus of claim 26, wherein said reflection controlling film has a first part for transmitting all of said beam of light from said first electro-optical element means to said first optical substrate means and a second part for transmitting part of said light from said first optical substrate means to said first electro-optical element means and reflecting part of said light back into said first optical substrate means.

28. The apparatus of claim 21, wherein said second optical phased linear array generator comprises said second electro-optical element means coupled to the obverse face of said second optical substrate means by a reflection controlling film and said third electro-optical element means coupled to the reverse face of the said second optical substrate means by a highly reflecting film.

29. The apparatus of claim 28, wherein said reflection controlling film has a third part for transmitting all of said beam of light from said second electro-optical element means to said second optical substrate means and a fourth part for transmitting part of said light from said second optical substrate means to said second electro-optical element means and reflecting part of said light back into said second optical substrate means.

30. The apparatus of claim 21, wherein the outputs of the said second optical phased linear array generator are two phased matrix arrays.

31. An optical light beam position control system having an input and an output comprising in combination:

a) means for generating a pencil of light rays;

b) a Kerr cell means having a first face for receiving said pencil of light rays, which transmits said beam of light to a second face adjacent to said first face, and which has a third face adjacent to said second face for transmitting an array of pencils of light rays, and which is responsive to a control signal;

wherein said first face receives said pencil of light rays and transmits said pencil of light rays to said second face;

wherein said second face receives said array of pencils of light rays and transmitts said array of pencils of light rays to said third face;

c) a Lummer-Gehrcke plate means having one face adjacent to said Kerr cell means second face for producing said array of pencils of light rays; which has a total reflecting coating on the reverse face;

wherein said Lummer-Gehrcke plate means receives said pencil of light rays from said Kerr cell means second face and transmits said array of pencils of light rays to said Kerr cell means second face;

d) means for controlling said Kerr cell means index of refraction; and an e) output means for receiving said array of pencils of light rays from said Kerr cell means said third face.

32. The apparatus of claim 31, further comprising a reflection control layer located between said Kerr cell means and said Lummer-Gehrcke plate means;

wherein said reflection control layer comprises a non-reflection part and a partially reflecting part;

wherein said non-reflecting part transmits all of said pencil of light rays into said Lummer-Gehrcke means, wherein said partially reflecting part transmits a portion of said pencils of light rays into said Lummer-Gehrcke means.

33. The apparatus of claim 32, wherein said reflection control layer comprises a non-reflection part and a partially reflecting part.

34. The apparatus of claim 33, wherein said non-reflecting part transmits all incidents light into said Lummer-Gehrcke means.

35. An optical light beam position control system having an input and an output comprising in combination;

a) means for generating a pencil of light rays;

b) an electro-optical means having a first face for receiving said pencil of light rays, which transmits said pencil of light rays to a second face adjacent to said first face, and which has a third face adjacent to said second face and opposite to said first face for transmitting an array of pencils of light rays, and which is responsive to a control signal;

c) an optical substrate means having one face adjacent to said electro-optical means second face for producing an array of pencils of light rays which has a total reflecting coating on the reverse face;

wherein said optical substrate means receives said pencil of light rays from said electro-optical means second face and transmits said array of pencils of light rays to said electro-optical means second face;

wherein said electro-optical means transmits said array of pencils of light rays to said third face;

d) means for controlling said electro-optical means index of refraction; and an e) output means for receiving said array of pencils of light rays from said electro-optical means third face.

36. The apparatus of claim 35, further comprising a reflection control layer located between said electro-optical means and said optical substrate means:

wherein said reflection control layer is in two parts;

wherein first part of said reflection control layer is a non-reflecting coating and the second part of said reflection control layer is a partially reflecting coating;

wherein said non-reflecting coating transmits all of said pencil of light rays from said electro-optical means into said optical substrate means;

wherein said partially reflecting coating transmits part of each ray of each pencil of said array of pencils of light rays from said optical substrate means into said electro-optical means.

37. An optical light beam position control system having an input and an output comprising in combination;
   a) means for generating a pencil of light rays;
   b) an electro-optical cell means having a first face for receiving said pencil of light rays, which transmits said pencil of light rays to a second face adjacent to said first face, and which has a third face adjacent to said second face and opposite to said first face for transmitting an array of pencils of light rays, and which is responsive to a control signal;
   c) a film means having one face adjacent to said electro-optical cell means second face to receive said pencil of light rays;
   wherein said film means regenerates said pencil of light rays into a series of geometrically degraded amplitude phase related pencils of light rays;
   wherein said geometrically degraded amplitude phase related pencils of light rays are transmitted to the said electro-optical cell means;
   wherein said electro-optical cell means receives said geometrically degraded amplitude phase related pencils of light rays from said film means at the said second face and transmits the said geometrically degraded amplitude phase related pencils of light rays to the said third face; and
   e) means for controlling said electro-optical cell means whereby the angle of refraction as the light enters said film means is a function of the index of refraction of said electro-optical cell means.

38. The apparatus of claim 37, further comprising a reflection control film located between said electro-optical cell means and said film means:
   wherein said reflection control film means comprises a non-reflection film and a highly reflecting film;
   wherein said non-reflecting film transmits all of said pencil of light rays into said film means;
   wherein said highly reflecting film transmits a portion of any light from said film means into said electro-optical means.

39. The apparatus of claim 38, wherein said reflection control film comprises a non-reflection film and a highly reflecting film.

40. The apparatus of claim 39, wherein said non-reflecting film transmits all of the incident beam of light into said film means.

41. The apparatus of claim 37, further comprising a total reflecting film located on the reverse face of the said film means.

42. An optical light beam position control system having an input and an output comprising in combination:
   a) means for generating a pencil of light rays;
   b) an optical cell means having a controllable index of refraction;
   wherein said optical cell means receives said pencil of light rays from said means for generating said pencil of light rays;
   wherein said optical cell means transmits said pencil of light rays;
   c) a multiple reflection interferometer means;
   wherein said multiple reflection interferometer means receives said pencil of light rays from said optical cell means;
   wherein said multiple reflection interferometer means regenerates said pencil of light rays into an array of phase related, geometrically degraded amplitude penciles of light rays;
   wherein said multiple reflection interferometer means transmits said array of phase related, geometrically degraded amplitude pencils of light rays to said optical cell means;
   wherein said optical cell means receives said array of phase related, geometrically degraded amplitude pencils of light rays from said multiple reflection interferometer means;
   wherein said array of phase related, geometrically degraded amplitude pencils of light rays are transported through said optical cell means;
   wherein said optical cell means transmits said array of phase related, geometrically degraded amplitude pencils of light rays;
   d) means for receiving said array of phase related, geometrically degraded amplitude pencils of light rays from said optical cell means and producing a set of interference fringes;
   e) means for controlling said optical cell means whereby the index of refraction is changed so as to change the lateral separation and optical path difference relation of said array of phase related, geometrically degraded amplitude pencils of light rays.

43. The apparatus of claim 42, wherein said input is a converging pencil of light rays and
   wherein said output is an array of diverging pencils of phase related, geometrically degraded amplitude light rays.

* * * * *